United States Patent [19]

Wheadon

[11] 4,376,156
[45] Mar. 8, 1983

[54] BATTERY INTERCELL CONNECTOR MANIFOLD

[75] Inventor: Ellis G. Wheadon, Anderson, Ind.

[73] Assignee: General Motors Corporation, Detroit, Mich.

[21] Appl. No.: 262,132

[22] Filed: May 11, 1981

[51] Int. Cl.³ ............................................. H01M 2/22
[52] U.S. Cl. ................................... 429/160; 429/161
[58] Field of Search ............................... 429/160, 161

[56] References Cited

U.S. PATENT DOCUMENTS

| | | | |
|---|---|---|---|
| 1,073,670 | 9/1913 | Ford | 429/160 |
| 2,222,412 | 11/1940 | King | 429/160 |
| 2,702,310 | 2/1955 | Kaye et al. | 136/111 |
| 2,883,443 | 4/1959 | Ruetschi et al. | 429/161 |
| 3,339,169 | 8/1967 | Freeland | 339/17 |
| 3,396,056 | 8/1968 | Gonnard | 429/160 |
| 3,494,798 | 2/1970 | Teeter et al. | 429/161 |

FOREIGN PATENT DOCUMENTS

| | | | |
|---|---|---|---|
| 1179559 | 1/1970 | United Kingdom | 429/160 |

*Primary Examiner*—Donald L. Walton
*Attorney, Agent, or Firm*—Lawrence B. Plant

[57] ABSTRACT

A multi cell electric storage battery having an intercell connector manifold sealed within a recess in the battery's cover. The manifold comprises a plurality of conductive lightweight links integral with a nonconductive carrier plate and secured to posts projecting from the battery's cell elements.

2 Claims, 5 Drawing Figures

BATTERY INTERCELL CONNECTOR MANIFOLD

BACKGROUND OF THE INVENTION

This invention relates to electric storage batteries and more particularly to lightweight, easily handled intercell connectors therefor.

Commercial monoblock batteries (e.g. lead-acid SLI storage batteries) comprise a container divided into a plurality of compartments by partitions which separate the several compartments. Each compartment contains an electrochemically active cell element immersed in an electrolyte. Each cell element has a post for conducting electrical current to and from the cell element. The several cells are electrically joined together (i.e. parallel or series connected) via their respective posts by a plurality of conductive links known as intercell connectors. In many instances, the discrete intercell connectors used heretofore have required individual handling during assembly and have added unnecessary weight to the battery. This latter limitation is particularly true in the case of Pb-acid batteries where the intercell connectors, and associated components required to make them, comprise lead.

It is an object of the present invention to provide a galvanic battery having a plurality of small, lightweight, easily handled and assembled intercell connectors.

This and other objects and advantages of the present invention will be more readily apparent from the detailed description thereof which follows.

THE INVENTION

The present invention comprehends a multi-cell, electric storage battery having a compartmented case wherein each compartment contains at least one cell element, and the several cell elements are electrically interconnected, via their associated posts, by means of an intercell connector manifold protectively sealed within a recess in the battery's cover. The manifold includes a plurality of small, highly conductive, lightweight (e.g. copper, aluminum, etc.) links integral with a nonconductive carrier plate for ease of handling and assembly. The manifold may be protectively sealed in the recess as by potting or the like, but is preferably protected by a secondary cover sealing off the recess. Appropriate seals are provided to prevent electrolyte from the compartments from reaching the manifold and corroding the links. In addition to carrying the links, the larger carrier plate facilitates the sealing operation by providing a relatively large surface (i.e. compared to the links) for effecting the seal.

DESCRIPTION OF A SPECIFIC EMBODIMENT

This invention may better be understood by way of reference to a specific example thereof which is described hereafter in conjunction with the Pb-acid battery illustrated in the several drawings in which.

Figure 1:
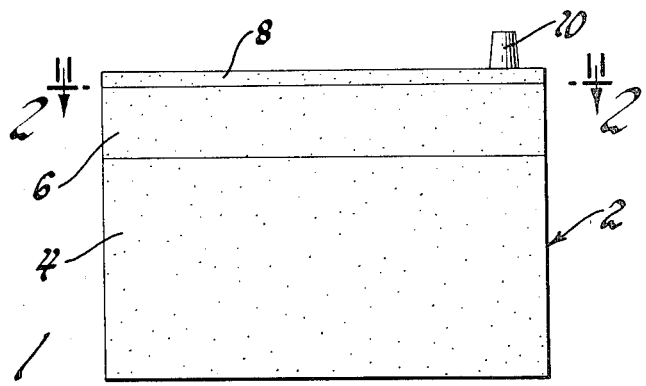
FIG. 1 is a side elevational view of a multi-cell Pb-acid electric storage battery.
Figure 2:
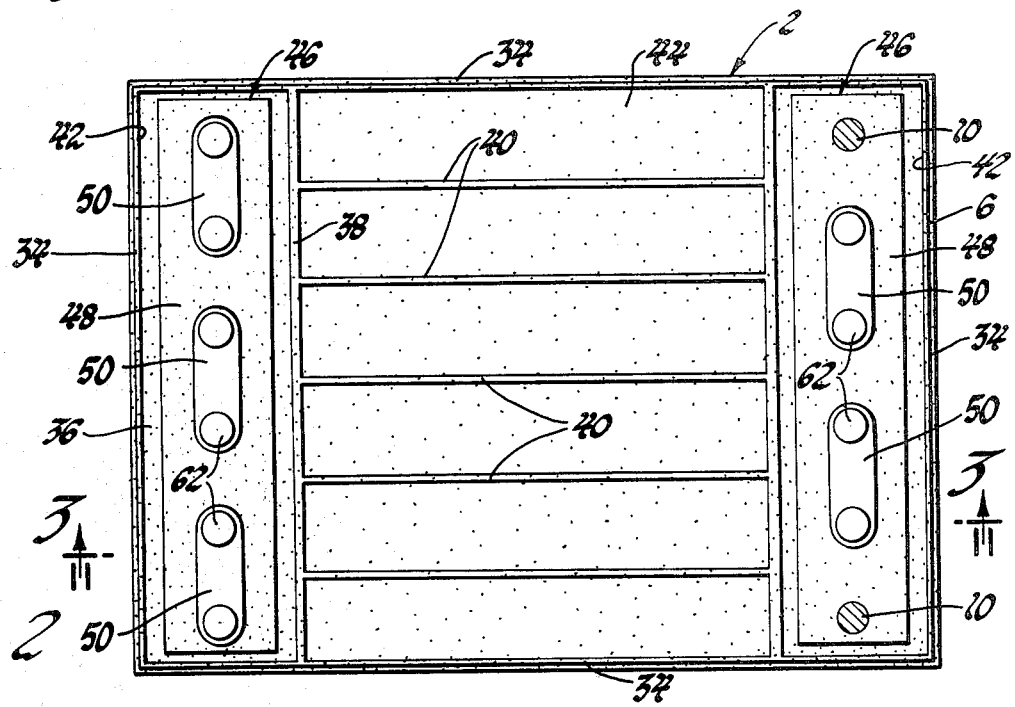
FIG. 2 is a plan view in the direction 2—2 of FIG. 1.

FIG. 1 illustrates a typical monoblock (i.e. mult-cell/-single case) lead-acid storage battery 2 comprising an open-ended case 4 closed off by a primary cover 6 and a secondary cover 8. A standard SAE type terminal 10 projects above the battery for a connection to appropriate external circuitry. The case 4 (see FIG. 4) is divided into a plurality of compartments 12 by means of a plurality of partitions 14 (only one shown). A conventional 12-volt SLI battery will include six such compartments 12, one for each lead-acid cell element 16.

The lead-acid cell element 16 comprises a plurality of positive polarity plates 18 interspersed a plurality of negative polarity plates 20 and separated one from the other by thin sheets of microporous material called separators. These plates comprise a reticulated grid having a plurality of grid wires 22 imbedded in a leady (i.e. $Pb/PbO_2$) active material 24. The plates 18 and 20 each include lugs 26 and 28, respectively, for electrically joining the several plates of like polarity within one cell element 16. Preferably these lugs are bundled together and fused into a single rod-like post (i.e. positive polarity post 30 and negative polarity post 32). The posts 30 and 32 project out of the compartments 12 for connection to posts from cell elements in adjacent cell compartments as will be discussed in more detail hereinafter.

The open end of the case 4 is closed off by a primary cover 6. The primary cover 6 includes: a peripheral skirt-like border 34 for rigidity and for sealing to the case 4 and to the secondary cover 8; a closure wall 36 for closing off the open ends of several cell compartments 12; transverse partitions 38 for defining a recess 42; and longitudinal partitions 40 defining a plurality of channels 44 in the cover substantially coextensive with the compartments 12. The transverse partitions 38 coact with peripheral border 34 to define recesses 42 at opposite ends of the battery which recesses traverse the several compartments 12 and serve to contain the intercell connector manifold of the present invention. The longitudinal partitions 40, on the other hand, coincide substantially with the case partitions 14 and serve to define a plurality of channels 44 for accommodating appropriate filling and/or venting structure (not shown). The secondary cover 8 closes off the primary cover 6 so as to protect the intercell connector manifold, complete the venting/filling structure contained in the channels 44 and otherwise improve the aethetics of the battery. Rather than a single secondary cover overlying the entire primary cover, two secondary covers may be used to independantly cover each recess 42 separately.

Figure 4:
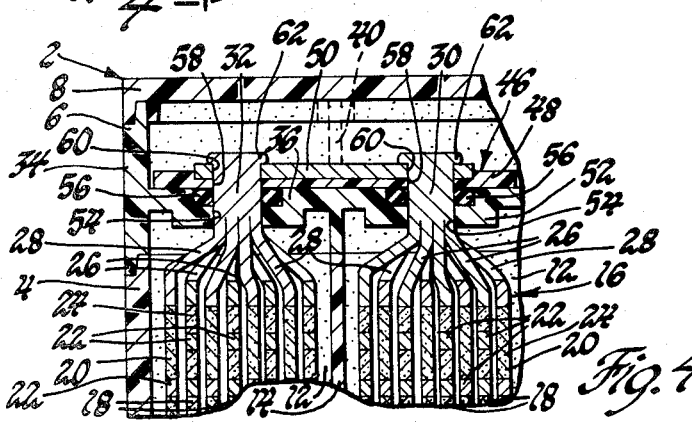
FIG. 4 is an enlarged sectional view in the direction 4—4 of FIG. 3.

In accordance with the present invention, an intercell connector manifold 46 is positioned in each recess 42 to interconnect the several cells according to a desired pattern. A conventional series connected battery is illustrated where the positive post 30 of one cell element is connected to the negative post 32 of the next adjacent cell element. The manifold 46 comprises an electrically non-conductive plate 48 (e.g. glass filled epoxy, reinforced phenolic, polypropylene, etc.) having a plurality of electrically conductive links 50 integral therewith for handling as a single unit during assembly of the battery. In a preferred embodiment, the links 50 are made from small lightweight, highly electrically conductive metal, such as copper. In one form of the invention, the copper links 50 are formed integral with the plate 48 using conventional printed circuit-board masking and electroforming techniques. In another form, the links 50 are formed integral with the plate 48 by conventional insert molding techniques. In still another form, the links 50 may be adhesively secured to the board 48. Highly conductive copper links 50 are relatively small compared to the size of lead intercell connectors for carrying the same current. Manifolding several of these small links together, in the manner described, reduces the number of parts that have to be handled during final assembly of the battery and permits the use of simple equipment at that stage of the assembly operation. As best shown in FIG. 4, the intercell connector manifold 46 has apertures 58 in the plate 48 and apertures 60 in the links 50 which are registered with an aperture 54 in the closure wall 36. The posts 30, 32 extend through the several aligned apertures 54, 58 and 60 and are secured (e.g. riveted) to the links 50 as illustrated at 62. The riveted heads 62 are thereafter preferably joined to the links 50 as by burning or soldering.

Figure 3:
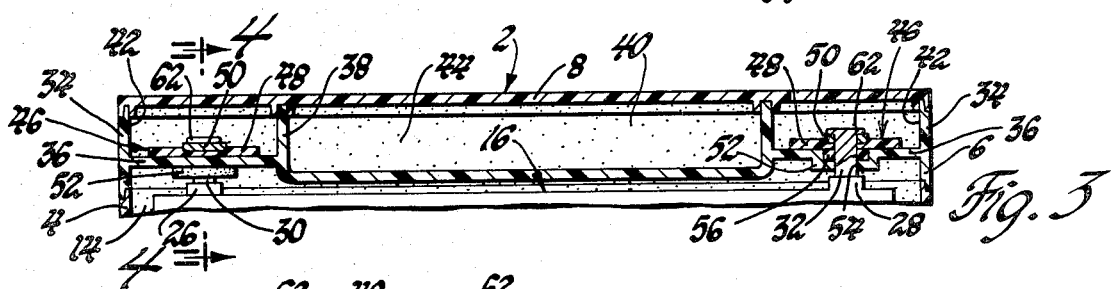
FIG. 3 is a side sectional view in the direction 3—3 of FIG. 2.

To prevent intercell shorting and corrosion of the links, the recess 42 must be sealed off from the electrolyte in the compartments. While this may be accomplished in a number of ways, FIGS. 3 and 4 illustrate one way in which the closure wall 36 includes a well 52 between the aperture 54 and the plate 48. Sealing O-rings 56 are placed in the well 52 and are compressed when the manifold 46 is pressed into place in the recess 42. This deforms the O-rings 56 causing them to constrictively engage the posts 30, 32 and sides of the well to prevent electrolyte leakage into the recess 42. While riveting alone may be sufficient to hold the manifold in place against the O-rings, it is preferred to further anchor the plate 48 to the wall 36 as by adhesive, ultrasonic welding, or the like.

Figure 5:
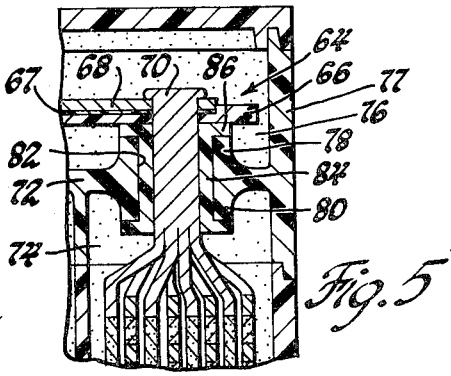
FIG. 5 depicts another type of seal useful with the present invention.

FIG. 5 depicts another sealing arrangement for the manifold of the present invention. An intercell connector manifold 64 has conductive links 68 embedded in and adhesively (i.e. adhesive 67) secured to the plate 66. A closure wall 72 which separates the compartment 74 from the recess 76 in the primary cover 77 includes opposed bosses 78 and 80 having a central aperture 82 therethrough. An elastomeric bushing 84 is radially compressed within the aperture 82 by insertion of the element post 70. Additional sealing is provided by compression of the flange 86 beneath the plate 66.

Hence, while the invention has been disclosed primarily in terms of specific embodiments thereof, it is not intended to be limited thereto but rather only to the extent set forth hereafter in the claims which follow.

The embodiments of the invention in which an exclusive property or privilege is claimed are defined as follows:

1. A multi-cell Pb-acid storage battery comprising:
   an open-ended case including a plurality of external walls defining a central cavity;
   a plurality of partitions dividing said cavity into several compartments each adapted to receive a galvanic cell element immersed in electrolyte, said cell element comprising a stack of alternately interleafed positive and negative polarity plates, said plates each having a lug projecting therefrom for electrically coupling the plate to other plates in the same cell element and to an adjacent cell element via an intercell connector;
   a cover sealed along its borders to said external walls and including a closure wall substantially completely overlying said open-end such as to substantially confine said electrolyte to said compartments;
   an undivided recess in said cover, said recess traversing said several compartments and defined in part by said closure wall;
   a terminal post on each element for concentrating the current flowing to and from a plurality of like-polarity plates in said element, said post projecting from a bundle of lugs from like-polarity plates through said closure wall and into said recess;
   a plurality of apertures in said closure wall and through which said posts project into said recess from said elements;
   seal means engaging said post and said closure wall at each said aperture for preventing passage of said electrolyte from said compartment into said recess through said aperture;
   a discrete intercell connector manifold in said recess adjacent said closure wall and traversing said several compartments, said manifold comprising a non-conductive carrier plate including as an integral part thereof a plurality of small, highly conductive links of lightweight, electrolyte-destructible metal and serving to permit en masse handling of said links and electrical coupling of the terminal posts of several different cell elements together into a plurality of sets according to a desired interconnection pattern;
   at least two openings in each said link, each said opening mating with and secured to a said post; and
   means for protectively covering said manifold.

2. A multi-cell Pb-acid storage battery comprising:
   an open-ended case including a plurality of external walls defining a central cavity;
   a plurality of partitions dividing said cavity into several compartments each adapted to receive a galvanic cell element immersed in electrolyte, said cell element comprising a stack of alternately interleafed positive and negative polarity plates, said plates each having a lug projecting therefrom for electrically coupling the plate to other plates in the same cell element and to an adjacent cell element via an intercell connector;
   a cover sealed along its borders to said external walls and including a closure wall substantially completely overlying said open-end such as to substantially confine said electrolyte to said compartments;
   an undivided recess in said cover, said recess traversing said several compartments and defined in part by said closure wall;
   a terminal post on each element for concentrating the current flowing to and from a plurality of like-polarity plates in said element, said post projecting from a bundle of lugs from like-polarity plates through said closure wall and into said recess;
   a plurality of apertures in said closure wall and through which said posts project into said recess from said elements;
   deformable seal means engaging said post and said closure wall at each said aperture for preventing passage of said electrolyte from said compartment into said recess through said aperture;
   a discrete intercell connector manifold in said recess traversing said several compartments and comprising a non-conductive carrier plate including as an integral part thereof a plurality of small, highly conductive, links of lightweight, electrolyte-destructible metal, said manifold compressing said seal means to enhance said electrolyte passage prevention while also serving to permit en masse handling of said links and electrical coupling of the terminal posts of several different cell elements together into a plurality of sets according to a desired interconnection pattern;

at least two openings in each said link, each said opening mating with and secured to a said post; and means for protectively covering said manifold.

* * * * *